F. BERARDI.
BEARING FOR PULLEY AND LIKE SHAFTS.
APPLICATION FILED JAN. 31, 1919.
1,320,972.
Patented Nov. 4, 1919.
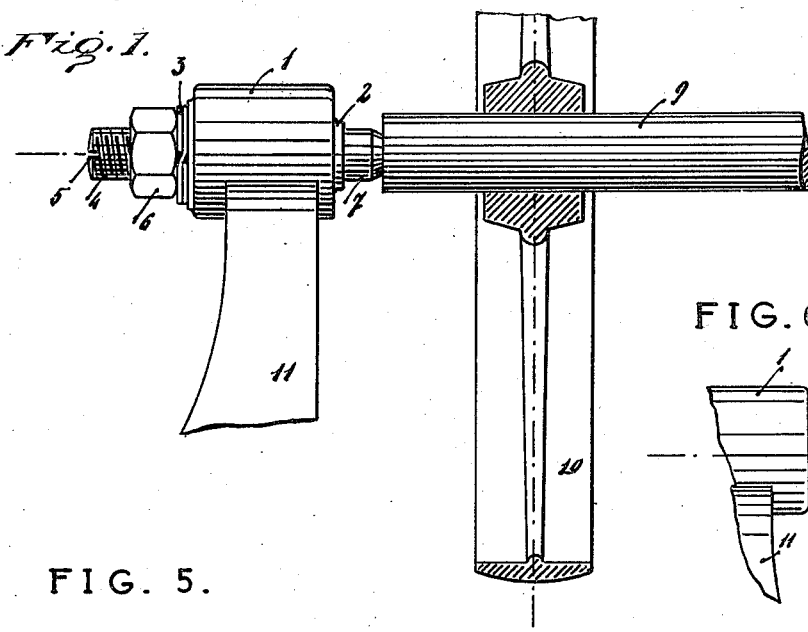
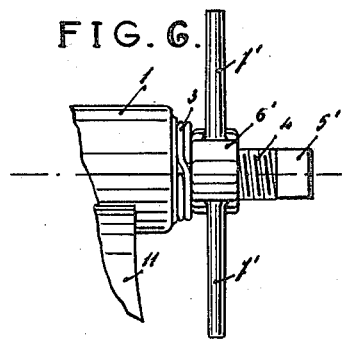
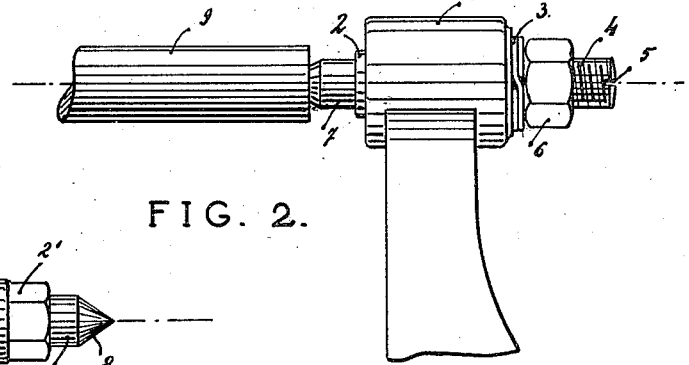
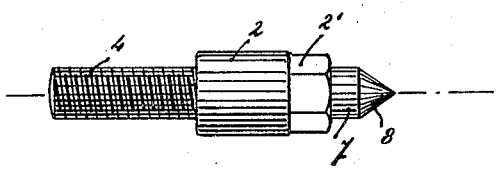
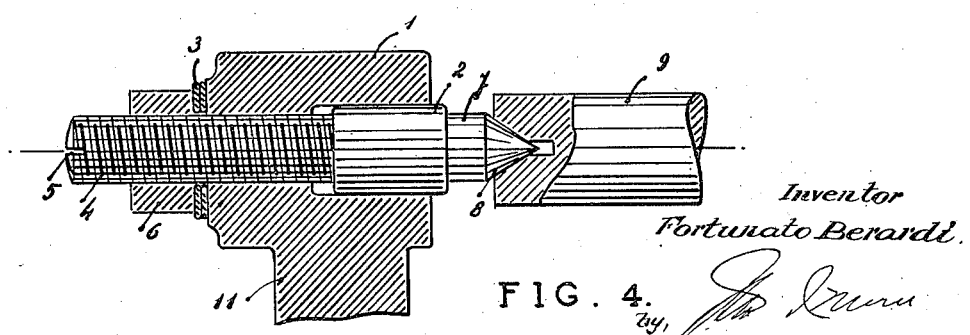
Inventor
Fortunato Berardi.
Attorney.

UNITED STATES PATENT OFFICE.

FORTUNATO BERARDI, OF NAPLES, ITALY.

BEARING FOR PULLEY AND LIKE SHAFTS.

1,320,972.  Specification of Letters Patent.  Patented Nov. 4, 1919.

Application filed January 31, 1919. Serial No. 274,294.

*To all whom it may concern:*

Be it known that I, FORTUNATO BERARDI, a subject of the King of Italy, and residing at 5 via Chiatamone, Naples, Italy, have invented certain new and useful Improvements in Bearings for Pulley and like Shafts, of which the following is a specification.

The invention relates to bearings for pulley and like shafts and its object is to provide a bearing wherein the usual frictional resistance is avoided or at all events greatly diminished. This object is attained by replacing the usual brasses by two steel or like pins which engage the ends of the shaft and between which the shaft is arranged to rotate.

In the drawings—

Figure 1 and Fig. 2 are an elevation of the coöperating bearings,

Fig. 3 is an elevation of a modified form of the pin,

Fig. 4 is a longitudinal section of the bearing shown in Fig. 1 or 2,

Fig. 5 shows the resilient washer,

Fig. 6 is an elevation of another modification of the device.

In the drawing, 1 is a cylindrical housing or sleeve arranged on or integral with a support 11 of any suitable design or shape. The hollow or bore within the sleeve comprises a wider forward portion and a threaded narrower rear portion and is intended to inclose the steel or like pin. The pin is formed near its forward end with a cylindrical expansion 2 which has a sliding fit within the wider forward portion of the sleeve bore, and it is screw-threaded rearwardly of the expansion as shown in 4 to engage the narrow rear portion of the bore. A washer 3 as shown in Fig. 5 is arranged on the pin and is pressed against the rear face of the sleeve by aid of a nut 6 screwed onto the pin 4 whose end has a cut or groove 5. The forwardly projecting end 7 of the pin is provided with a conical point 8 which fits snugly within a recess 8' provided in the end of the shaft 9 carrying a pulley 10.

It is evident that the grip of the conical point 8 on the shaft 9 may be regulated by rotating a pin within the sleeve with aid of turn-screw engaging the slot 5 in the end of the pin, and the expansion 2 serves to guide the conical point and to prevent displacements thereof even when the threaded portion of the pin is not in perfect working conditions. The resilient washer 3 which is held against the sleeve 1 by the nut 6 sets up a certain pressure between the parts 1 and 7 and through the friction produced thereby prevents the pin rotating or being displaced respecting the shaft.

In the modified construction of the pin shown in Fig. 3 which is particularly adapted for heavy shafts, an expansion 2' of appropriate shape is provided on the pin forwardly of the expansion 2 and serves to rotate the pin with aid of a wrench, or the said expansion and the pin may be traversed by a hole to insert means for operating the pin.

In the constructional form shown in Fig. 6 the pin is provided with a square or rectangular end portion 5' to apply a wrench, while the nut 6 is replaced by a nut 6' with arms or wings 7' which form an easy means to operate the pin.

What I claim is:

1. A stationary sleeve having a screw-threaded bore and a smooth bore disposed forwardly of the screw-threaded bore and having a larger diameter, a pin having its rear portion threaded to engage in the screw-threaded bore and carrying forwardly of the screw-threaded portion an enlargement which slidably fits in the smooth bore, said pin having its forward end conical, a shaft having a conical recess to receive the conical end of the pin, means whereby the pin may be turned, and means to lock the pin against turning movement.

2. In a bearing for pulley and like shafts, the combination with a shaft, a steel pin at either end of the shaft and provided with a conical point to engage a recess provided in the end of the shaft, a sleeve surrounding the pin and having a bore with a wider forward portion and a narrower threaded rear portion in engagement with a threaded portion on the pin, a cylindrical expansion on the pin within the wider forward portion of the sleeve bore, a washer arranged on the pin rearwardly of the sleeve, a nut to press the washer against the sleeve, a support for the sleeve and means to impart a rotary motion to the pin inside the sleeve so as to regulate the piston of the conical point respecting the shaft.

In testimony whereof I have signed my name in the presence of two subscribing witnesses the 7th day of December, 1918.

FORTUNATO BERARDI.

Witnesses:
G. ARTINDY,
GUGLIELMO COPPA.

Copies of this patent may be obtained for five cents each, by addressing the "Commissioner of Patents, Washington, D. C."